United States Patent
Orlamünder

(10) Patent No.: US 6,793,058 B2
(45) Date of Patent: Sep. 21, 2004

(54) CLUTCH DISK ARRANGEMENT FOR A MULTI-DISK CLUTCH

(75) Inventor: Andreas Orlamünder, Schweinfurt (DE)

(73) Assignee: Mannesmann Sachs AG, Schweinfurt (DE)

( * ) Notice: Subject to any disclaimer, the term of this patent is extended or adjusted under 35 U.S.C. 154(b) by 0 days.

(21) Appl. No.: 10/274,623

(22) Filed: Oct. 21, 2002

(65) Prior Publication Data

US 2003/0070897 A1 Apr. 17, 2003

Related U.S. Application Data

(62) Division of application No. 09/573,248, filed on May 18, 2000, now Pat. No. 6,523,662.

(30) Foreign Application Priority Data

May 19, 1999 (DE) .......................................... 199 22 874
Dec. 24, 1999 (DE) .......................................... 199 63 023

(51) Int. Cl.[7] ............................................. F16D 13/64
(52) U.S. Cl. .................... 192/70.2; 192/70.17; 192/212
(58) Field of Search .......................... 192/70.16, 70.19, 192/70.2, 70.17, 212

(56) References Cited

U.S. PATENT DOCUMENTS

| | | |
|---|---|---|
| 1,536,588 A | 5/1925 | Judd |
| 1,848,843 A | 3/1932 | Ruesenberg |
| 3,446,323 A | 5/1969 | Hilpert |
| 3,666,062 A * | 5/1972 | Riese ....................... 192/70.28 |
| 4,592,458 A | 6/1986 | Matsuki et al. |
| 5,355,984 A | 10/1994 | Grabis ..................... 192/70.17 |
| 5,577,582 A | 11/1996 | Lindsay |

FOREIGN PATENT DOCUMENTS

| | | | |
|---|---|---|---|
| DE | 20 52 899 | 5/1971 | |
| DE | 24 60 963 | 7/1976 | |
| EP | 1 058 018 A2 | 6/2000 | |
| JP | 60-192123 | 9/1985 | ........... F16D/13/44 |
| JP | 10-103370 | 4/1998 | ........... F16D/13/46 |

\* cited by examiner

Primary Examiner—Saúl J. Rodríguez
(74) Attorney, Agent, or Firm—Cohen, Pontani, Lieberman & Pavane

(57) ABSTRACT

A clutch disk arrangement for a multi-disk clutch includes a hub element connectable to a shaft for rotation with the shaft about an axis of rotation. A carrier arrangement has a first carrier element and a second carrier element. The first carrier element is connected to the hub so that the first carrier element rotates with the hub. The second carrier element is connected to the first carrier element such that it is foxed with respect to rotation and axially movable relative to the first carrier element. The clutch disk arrangement further comprises at least two friction lining units. On of the friction lining units is firmly connected to the first carrier element and a second one of the friction elements is firmly connected to the second carrier element. Accordingly, the friction lining units are fixed with respect to rotation and axially movable relative to the hub element via the carrier arrangement.

11 Claims, 9 Drawing Sheets

CLUTCH DISK ARRANGEMENT FOR A MULTI-DISK CLUTCH

CROSS-REFERENCE TO RELATED APPLICATION(S)

This application is a Divisional of U.S. patent application Ser. No. 09/573,248, filed May 18, 2000 now U.S. Pat. No. 6,523,662, which claims priority from Applications filed in Germany on May 19, 1999, No. 199 22 874.4, and on Dec. 24, 1999, No. 199 63 023.2.

BACKGROUND OF THE INVENTION

1. Field of the Invention

The present invention relates to a clutch disk arrangement for a multi-disk clutch having a hub element fixedly connectable with respect to rotation to a shaft, a carrier arrangement fixedly connected with respect to rotation to the hub, and two friction linings connected to the hub via the carrier arrangement such that the two friction linings are fixed with respect to rotation and axially moveable relative to the hub element.

2. Description of the Related Art

A clutch disk arrangement having two friction lining units is disclosed in German reference DE-A 24 60 963. A first one of the two friction lining units is connected firmly to a hub via a torsional vibration damper. A carrier part is also firmly connected to the hub by the torsional vibration damper. A second one of the two friction lining units is connected to the carrier part so that it is fixed with respect to rotation and axially movable.

Another clutch disk arrangement comprising a multi-disk clutch with a friction lining unit carrier is disclosed in German reference DE-A 20 52 899. The friction lining carrier of this device comprises a solid component connected firmly to a hub via a torsional vibration damper. This carrier has an essentially T-shaped sectional contour. The radially outer region of the carrier is connected to a plurality of friction lining units such that the plural friction lining units are fixed with respect to rotation and axially movable relative to said carrier. A problem with this carrier is that due to its T-shaped sectional contour, the carrier must be formed in a casting process or by machining which is a relatively expensive operation.

SUMMARY OF THE INVENTION

The object of the present invention is to provide a clutch disk arrangement for a multi-disk clutch which is simple to construct and may be used for a variety of different clutch disk arrangements.

According to an embodiment of the present invention, the object is achieved by a clutch disk arrangement for a multi-disk clutch having a hub element fixedly connectable to a shaft with respect to relative rotation, a carrier arrangement connected to the hub, and at least two friction lining units fixed with respect to rotation relative to the carrier arrangement such that friction linings are connected to the hub via the carrier arrangement.

The carrier arrangement further comprises a first carrier element and a second carrier element, wherein the first carrier element is fixedly connected with respect to rotation and axially movable relative to the second carrier element. The first carrier element is connected to the hub element and is connected to a first one of the at least two friction lining elements. A second one of the at least two friction lining units is firmly connected to the second carrier element.

This configuration of a clutch disk arrangement for a multi-disk clutch according to an embodiment of the present invention ensures that the axial relative motion between the individual friction lining units required for carrying out clutch engagement and disengagement operations is separated in terms of design from the friction lining units and is transferred to the region of the carrier elements. That is, the friction lining units are not required to be designed for this function of the required axial relative motion. This allows these design areas to be optimized in accordance with the relevant operating requirements thereby increasing the operating reliability and simplifying the construction and contributing to a reduction in costs. In addition, this modular configuration allows adaptation to a very wide variety of clutch configurations simply by replacing various modular areas by other modular areas.

For example, the first carrier element may comprise a first engagement formation projecting substantially radially outward and the second carrier element may have a second engagement formation projecting substantially radially inward and in meshed engagement with the first engagement formation. This engagement may, for example, be achieved if the first engagement formation comprises a longitudinally extending external toothing and the second engagement formation comprises a longitudinally extending internal toothing. To minimize cost and space requirements, at least one of the first and second carrier elements may comprise a substantially cup-shaped design having a cup base region and a circumferential wall region.

The substantially cup-shaped configuration of at least one of the first and second carrier elements allows a functional separation between various areas. For example, if the first and second carrier elements have a cup-shaped design, the friction lining units may be fixed onto respective base regions of the first and second carrier elements and the first and second engagement formations may be formed in the circumferential wall regions of the first and second carrier element. Accordingly, the axial mobility of the friction lining units is effected by the axially movable connection between the first and second carriers which is functionally separate from the friction lining units.

In the above configuration of the clutch disk arrangement according to the embodiment of the present invention, the first and/or the second carrier element may be formed by a forming operation such, for example, as a press forming operation from a sheet-metal blank. The simple formation operation contributes considerably to a low overall cost for the a clutch disk arrangement according to the present invention.

The clutch disk arrangement according to the present invention is also suitable for use with multi-disk clutches which have more than two friction lining units. For this purpose, the second carrier element having the second engagement formation may comprise a third engagement formation projecting substantially radially outward for engagement of at least one further friction lining unit to this carrier element in a manner which prevents relative rotation and allows axial movement.

This connection may be achieved if the third engagement formation is formed by or during the integral formation of the second engagement formation. In the clutch disk arrangement according to the present invention, one of the carrier elements is preferably fixedly connected to the hub element. Therefore, axial movement of the friction lining unit connected to that carrier element that is connected to the hub is effected by axial movement of the hub.

According to a further embodiment of the present invention, the object of the present invention is achieved by a clutch disk arrangement comprising a carrier arrangement having a carrier element with a cup-shaped design which is connected to the hub element.

In this embodiment, the carrier element further comprises a circumferential wall region with an engagement formation with which respective counterengagement formations on the friction lining units engage. The engagement between the carrier element and the friction lining units prevents relative rotation and allows relative axial displacement. The engagement formation of the carrier element preferably comprises an external toothing which extends longitudinally along the direction of the axis of rotation.

In this embodiment production costs may be minimized if the carrier element is produced in a forming operation such, for example, as a press forming operation from a sheet-metal blank.

To obtain rotational coupling of the friction lining units to the carrier element, each of the friction lining units comprises at least one lining carrier element which comprises at least one part of the counterengagement formation. The at least one part of the counter engagement formation may comprise an engagement projection. In the preferred embodiment, a plurality of engagement projections are arranged on the at least one lining carrier element.

The counterengagement formation may be obtained in a simple manner if at least one contact surface is formed on at least one engagement projection by bending a tab-like extension provided on the engagement projection.

In a further embodiment of the clutch disk arrangement according to the invention, the carrier element connected to the hub element is firmly connected to the hub element via a torsional vibration damper. Therefore, in the context of the present invention, the expressions "connected" or "firmly connected" also includes a limited relative rotary motion or a slight relative axial motion of the various components connected to one another, due, for example, to elasticity, either of a torsional vibration damper or of materials themselves.

In this embodiment, a base region of the carrier element may be connected to the hub element to form a central disk element of the torsional vibration damper. Furthermore, cover disk elements may also be arranged on the hub element, on each side of the central disk element with at least one damping element acting between the central disk element and the cover disk elements.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings, wherein like reference characters denote similar elements throughout the several views.

DETAILED DESCRIPTION OF THE PRESENTLY PREFERRED EMBODIMENTS

Figure 1:
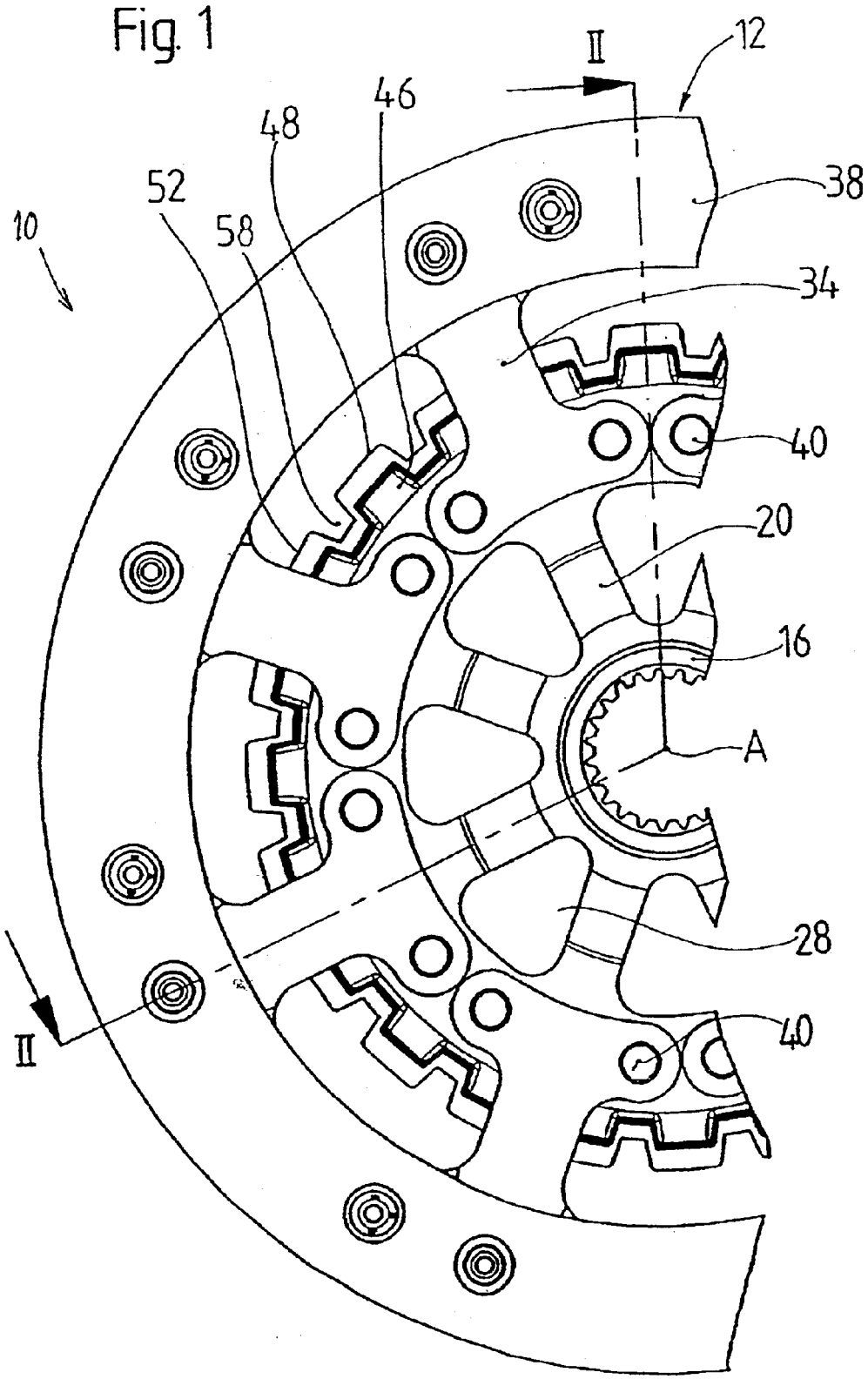
FIG. 1 is a partial axial view of a clutch disk arrangement according to an embodiment of the present invention.
Figure 2:
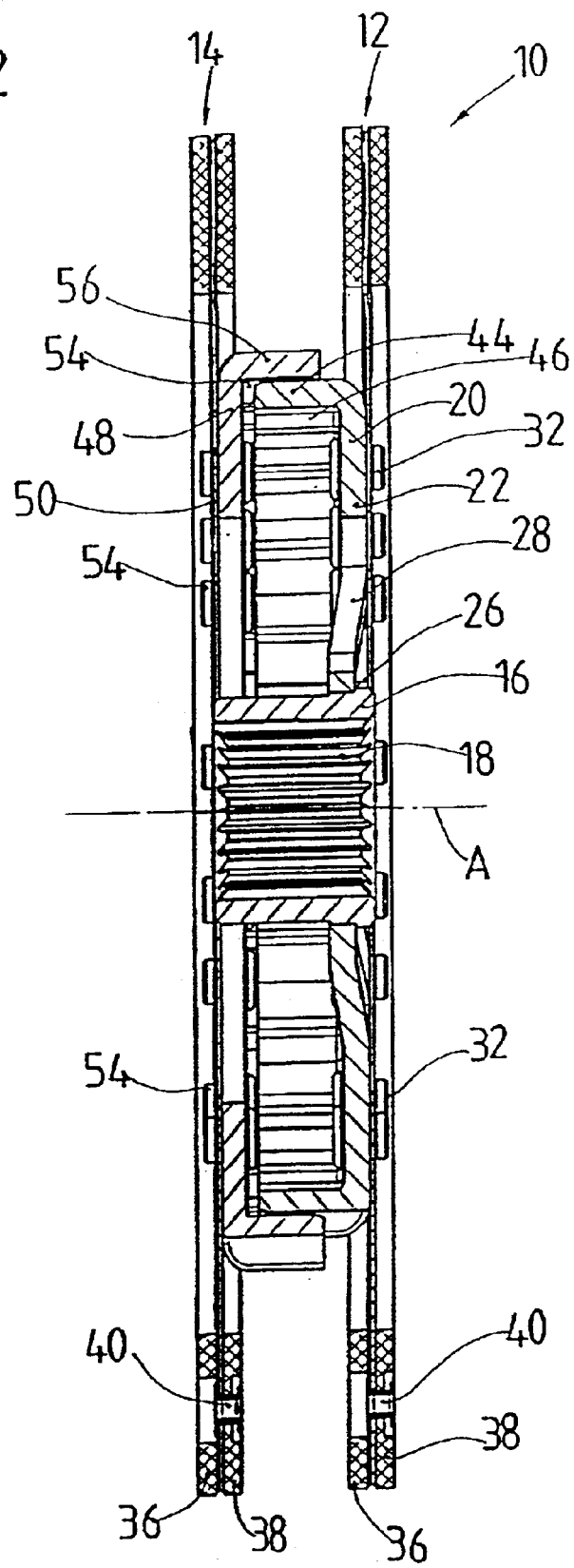
FIG. 2 is a longitudinal sectional view of the clutch disk arrangement shown in FIG. 1, along the line II—II in FIG. 1.
Figure 3:
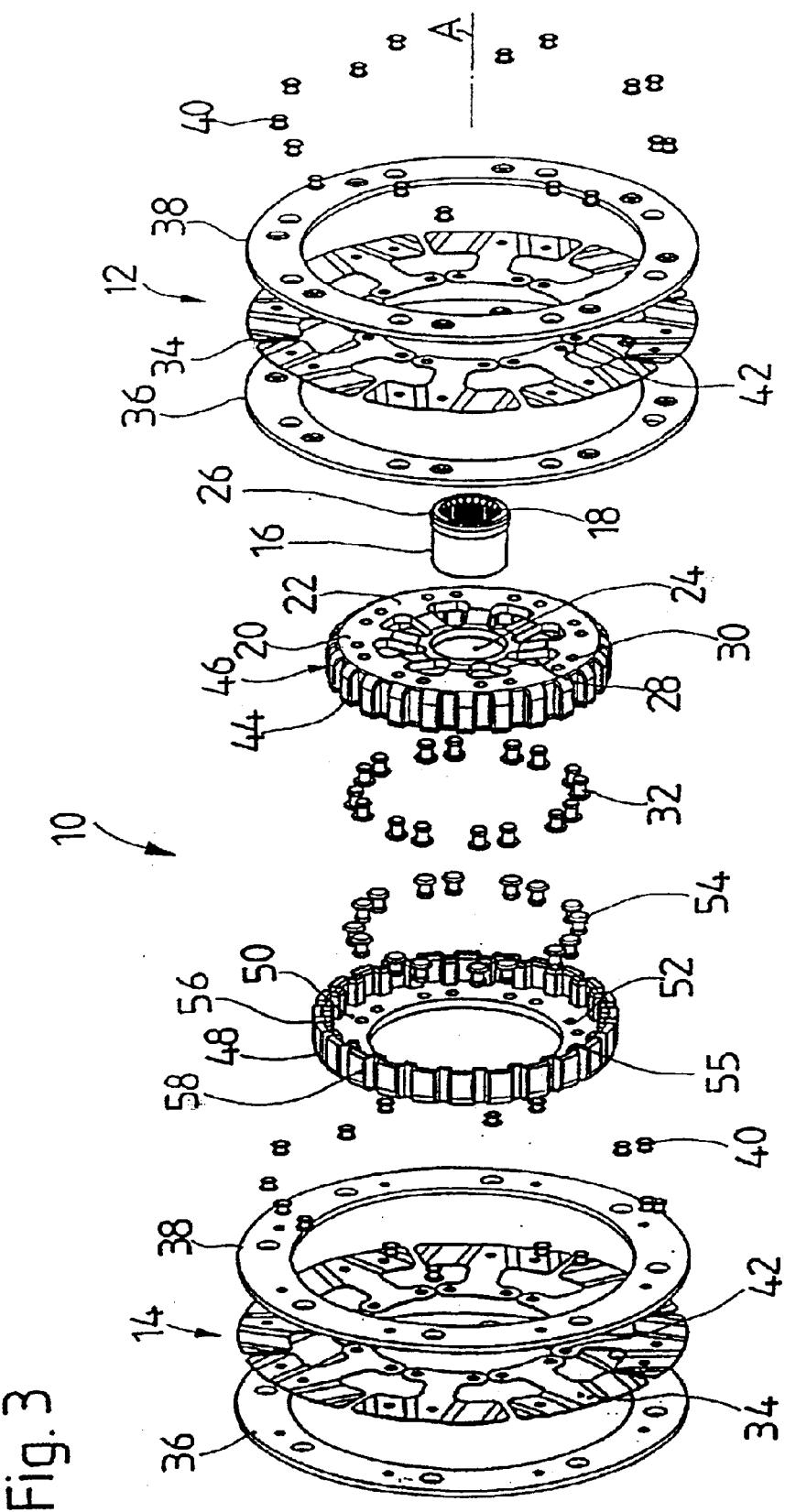
FIG. 3 is a perspective exploded view of the clutch disk arrangement of FIG. 1.

Referring to FIGS. 1 to 3, a clutch disk arrangement 10 according to the present invention for use with a multi-disk clutch comprises first and second friction lining units 12, 14 which, as described below, are arranged at a distance from one another in the direction of an axis of rotation A about which the clutch disk arrangement 10 rotates when the clutch is in operation. The first and second friction lining units 12, 14 are axially displaceable relative to one another in the direction of the axis of rotation A to allow clutch engagement and disengagement operations.

As shown, in particular, in FIG. 3, the clutch disk arrangement 10 according to the invention comprises a hub element 16. An inner circumferential surface of the hub element has a toothing 18 which is connectable via a rotationally rigid coupling with a shaft, e.g. a transmission input shaft (not shown).

A first carrier element 20 is firmly connected to the hub element 16. FIG. 2 shows that the first carrier element 20 comprises an essentially cup-shaped design with a cup base region 22 and a circumferential wall region 44. A central opening 24 is arranged in the cup base region 22 and is pushed onto the hub element 16 until the cup base region 22 strikes axially against an annular shoulder 26 on the hub element 16. After the cup base 22 contacts the annular shoulder 26, the first carrier element 20 may be fixedly connected on the hub element 16 by caulking, welding or other suitable connection. Furthermore, essentially triangular-shaped openings 28 are formed in the cup base region 22 for reducing the weight of the first carrier element 20. A plurality of rivet openings 30 are provided in the region of the cup base region 22 through which rivet studs 32 are passed. The first friction lining unit 12 is fixed on the first carrier element 20 via the rivet studs. The first friction lining unit 12 comprises a plurality of lining-spring elements 34 which are bent out of spring sheets. Two friction linings 36, 38 are fixedly connected by rivet studs 40 to the radially inner regions of the lining-spring elements 34 which have openings 42 for the passage of the rivet studs 32. Therefore, the lining-spring elements 34 are first fixedly connected to the friction linings 36, 38 and then riveted to the radial inner region of the first carrier element 20.

The circumferential wall region 44 of the first carrier element is formed integrally with the cup base region 22 from a sheet-metal blank in a forming operation, e.g. a press forming operation such as a deep-drawing operation. The circumferential wall region 44 is shaped such that it forms a toothing configuration 46, the teeth of which are open radially outward and extend with channels formed between them and extending in the direction of the axis of rotation A.

The clutch disk arrangement 10 according to the present invention also comprises a second carrier element 48 which is of almost identical construction to the first carrier element 20 but with a slightly larger diameter. The second carrier element 48 thus also has a cup base region 50 in which, once again, there is a plurality of passage openings 52 for rivet studs 54 for attaching the friction lining unit 14 to the second carrier element 48. A circumferential wall region 56 of the second carrier element 48 is, in turn, constructed with a toothing configuration 55 having teeth which project radially inward. Channels formed between the teeth of the toothing configuration 55 extend essentially in the direction of the axis of rotation A. A stated above, the diameter of the first carrier element 20 is smaller than the diameter of the second carrier element 48 such that when the second carrier element 48 is pushed axially onto the first carrier element 20, the two toothing configurations 46, 55 enter into a meshed engagement with one another such that they are fixed in terms of relative rotation but are axially displaceable relative to one another (see FIGS. 1 and 2). With respect to the second friction-lining unit 14, it should be stated that this is of essentially identical construction to the first friction lining unit 12. Accordingly, the second friction lining unit 14 also has a plurality of lining-spring elements 34 which are arranged in succession in the circumferential direction. Two friction lining 36, 38 are riveted to the radially outer region of the lining-spring elements 34 and the radial inner region of the lining-spring elements 34 are riveted by rivet studs 40 to the cup base region 50 of the second carrier element 48.

It should also be noted that the axial mobility of the first friction lining unit 12 is achieved by axial movement of the hub 16 on the shaft to which it is connectable. The second friction lining unit 14 is further axially movable relative to the first friction lining unit via the connection between the first and second carrier elements 20, 48.

The clutch disk arrangement 10 according to the embodiment of FIGS. 1–3 may be constructed by a simple operation and the function of axial relative displacement of the first and second friction lining units 12, 14 is achieved via the axially movable connection between the first and second carrier elements 20, 48. Accordingly, the friction lining units 12, 14 may comprise a simple design because the axial displacement function is not required to be integrated into the first and second friction lining units 12, 14. In particular, the first and second friction lining units 12, 14 may be configured as those friction lining units which are used with conventional single-disk clutches. As stated above, the function of the lining-spring elements and the function of allowing axial displacement are separated. Accordingly, each of the subassemblies may be constructed with the thickness and with the material required for the particular function with which the subassembly is associated. Accordingly, the first and second carrier elements may be obtained by forming sheet metal which furthermore contributes to construction of the inventive clutch disk arrangement at reasonable cost.

It should further be noted that an embodiment of this kind may be used not only with twin-disk clutches but also with a multi-disk clutch, which require more than two friction lining units. It will be appreciated that introducing the toothing configuration 54 into the second carrier part 48 during a forming operation produces a toothing configuration 58 on the radial outward facing side of the circumferential wall region 56. The toothing configuration 58 may be used to support another friction lining unit in a manner which prevents relative rotation and allows axial movement. Regarding the construction of a friction lining unit that is arrangeable on the toothing configuration 58, attention is drawn to the following description of the embodiment shown in FIGS. 4 to 6. It is also possible for a plurality of such additional friction lining units to be provided. For example, the region of overlap between the first and second carrier elements 20, 48 may be made shorter, thereby allowing the toothing configuration 46 of the first carrier element 20 also to accept another friction lining unit, which is then axially movable both relative to the first friction lining unit 12 and to the friction lining unit 14.

Figure 7:
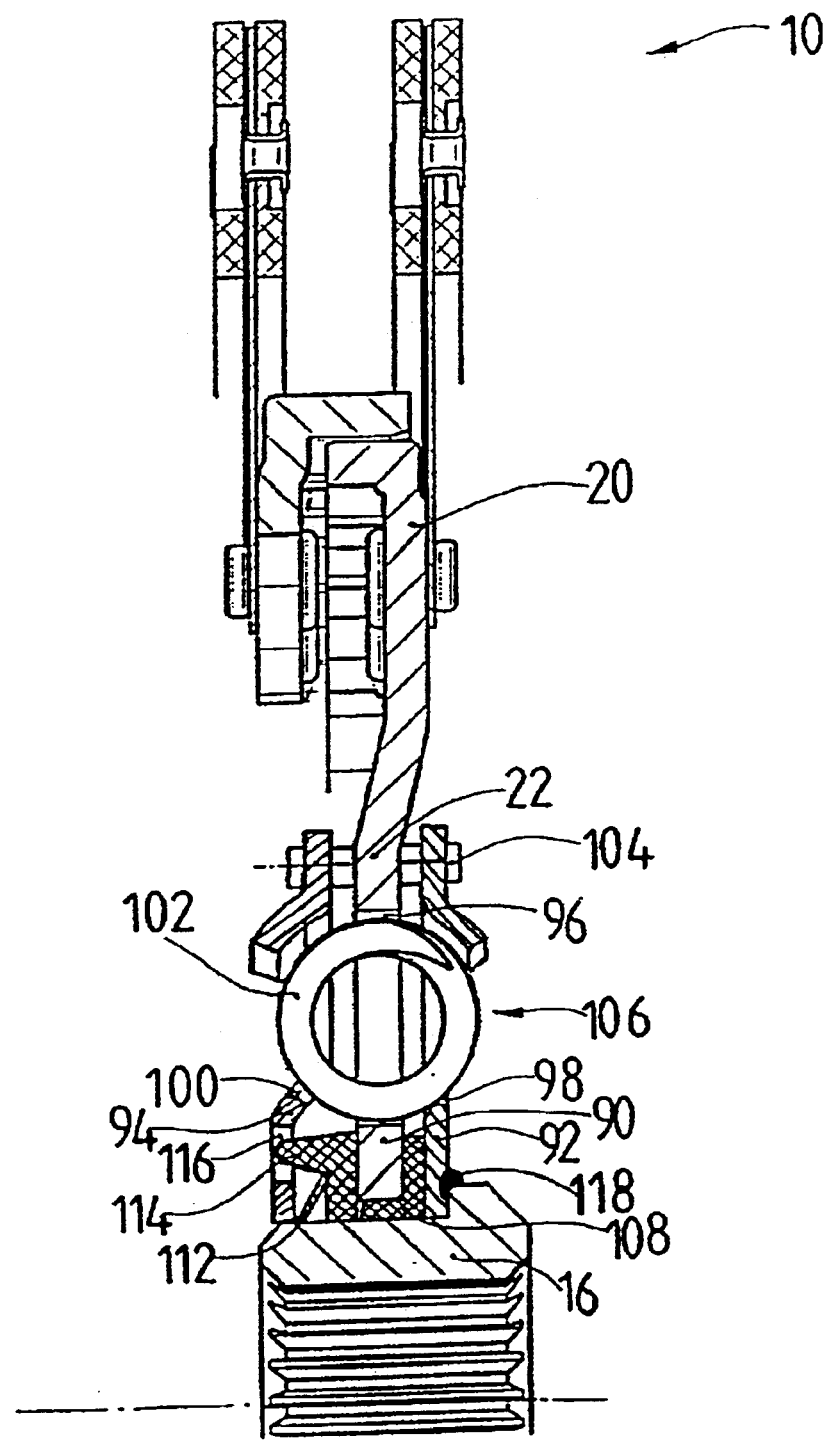
FIG. 7 is a partial sectional view of the clutch disk arrangement of FIGS. 1–3 with a torsional vibration damper; end
Figure 8:
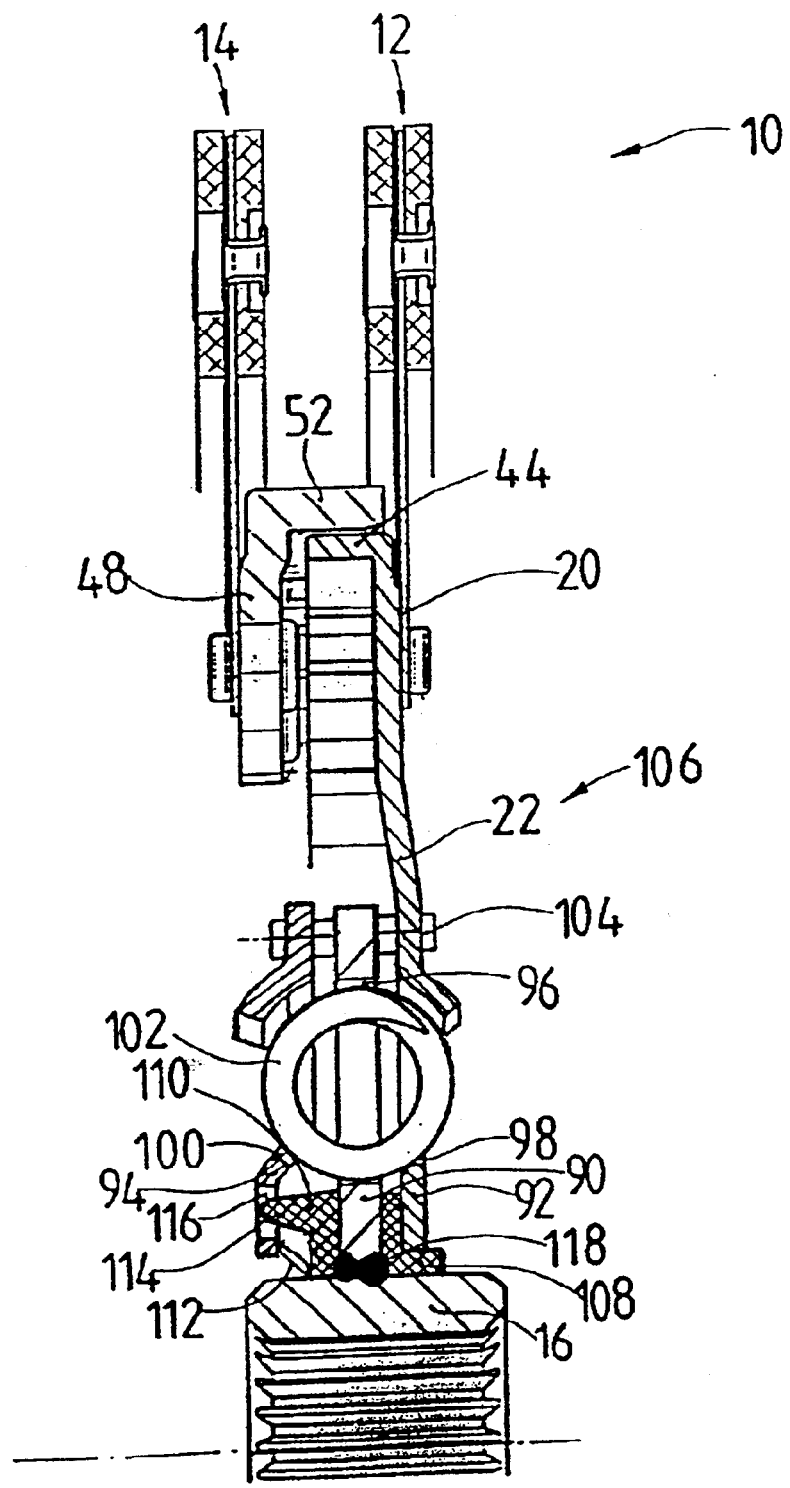
FIG. 8 is a partial sectional view of another embodiment of the clutch disk arrangement of FIGS. 1—3 with a torsional vibration damper.

Attention is also drawn to the fact that, as shown in FIGS. 7 and 8, a torsional vibration damper may be integrated into the clutch disk arrangement 10 of FIGS. 1–3. In FIG. 7, the first carrier element 20 is connected to the hub element 16 by a torsional vibration damper 106, rather than by form-fitting or cohesive joining. For this purpose, the cup base region 22 of the first carrier element 20 may, for example, form a central disk element 90 of the torsional vibration damper 106. Cover elements 92, 94 may be arranged so that they rest against both axial sides of the central disk element 90. The cover disk elements 92, 94 are firmly connected to the hub element 16. Referring to FIG. 7, it is apparent that the radially inner region of the cover disk element 92 is welded to the hub element 16 via a weld 118. It is also possible for the form-fitting contact to take some other form. The two cover disk elements 92, 94 are connected firmly to one another by a plurality of rivet studs or the like 104 distributed in the circumferential direction. The rivet studs 104 may pass through openings (not shown) in the cup base region 22 to form a limit to the angle of rotation of the torsional vibration damper 106.

In the embodiment of FIG. 7, the central disk element 90 is otherwise not firmly connected directly to the hub element 16. Accordingly, the two cover disk elements 92, 94 and the cup base region 22 (i.e., central disk element 90) may comprise respective spring apertures 96, 98, 100, on which are supported in the circumferential direction respective damper springs 102 which permit a rotational movement of the cup base region 22 relative to the cover disk elements 92, 94 within a limited angle of rotation. By means of a support ring 108 of approximately L-shaped cross-sectional profile, the cup base region 22 is, on the one hand, supported in the radial direction, in its radially inner portion, on the hub element 16 and supported in the axial direction on the cover disk element 94. A friction ring 110 may be positioned on the other axial side of the cup base region 22, this friction ring 110 being pressed against the base region 22 by a spring 112, e.g. diaphragm spring supported against the cover disk element 94. Projections 114 may be formed on the friction ring 110 which engage corresponding cutouts 116 in the cover disk element 94. Accordingly, the friction ring 110 is movable within a predetermined circumferential range relative to the cover disk element 94. The frictional effect which arises between the friction ring 110 and the cup base region 22 may then be delayed, i.e. may start only after a predetermined angle of relative rotation has been exceeded. Up to that point, there is a frictional effect between the friction ring 110 and the spring 112 and/or the spring 112 and the cover disk element 94. The support ring 108 can also be formed from a material which contributes to increasing the friction force.

FIG. 8 shows an alternate embodiment of the clutch disk arrangement of FIG. 7 in which the central disk 90 and the support ring 108 are fixedly connected to the hub 16 via a weld 118. In this embodiment, the cover disks 92, 94 are rotatable about the hub element 16 and the first carrier element 20 is connected to the cover disks 92, 94. The cover disk 92 is urged against the support ring 108 by the urgency of the spring 112 arranged between the friction ring 110 and the cover disk 94. The remainder of the configuration of FIG. 8 is the same as that shown and described in FIG. 7.

It should be pointed out that the torsional vibration damper 106 of FIGS. 7 and 8 may comprise any type of torsional vibration damper. In particular, the torsional vibration damper 106 may comprise a plurality of the springs 102 arranged in series and these springs are supported against one another via respective sliding shoes or the like. The torsional vibration damper 106 may also comprise a multi-stage damper with an idle damping section and a load damping section, as known per se for clutch disks. It is also possible to use the cup base region 22 as one of the cover-disk elements and to arrange at an axial distance from it another cover disk element, which is firmly connected to the carrier element 20. Between the cover disk elements, a central disk element is connected firmly to the hub element 16.

Figure 4:
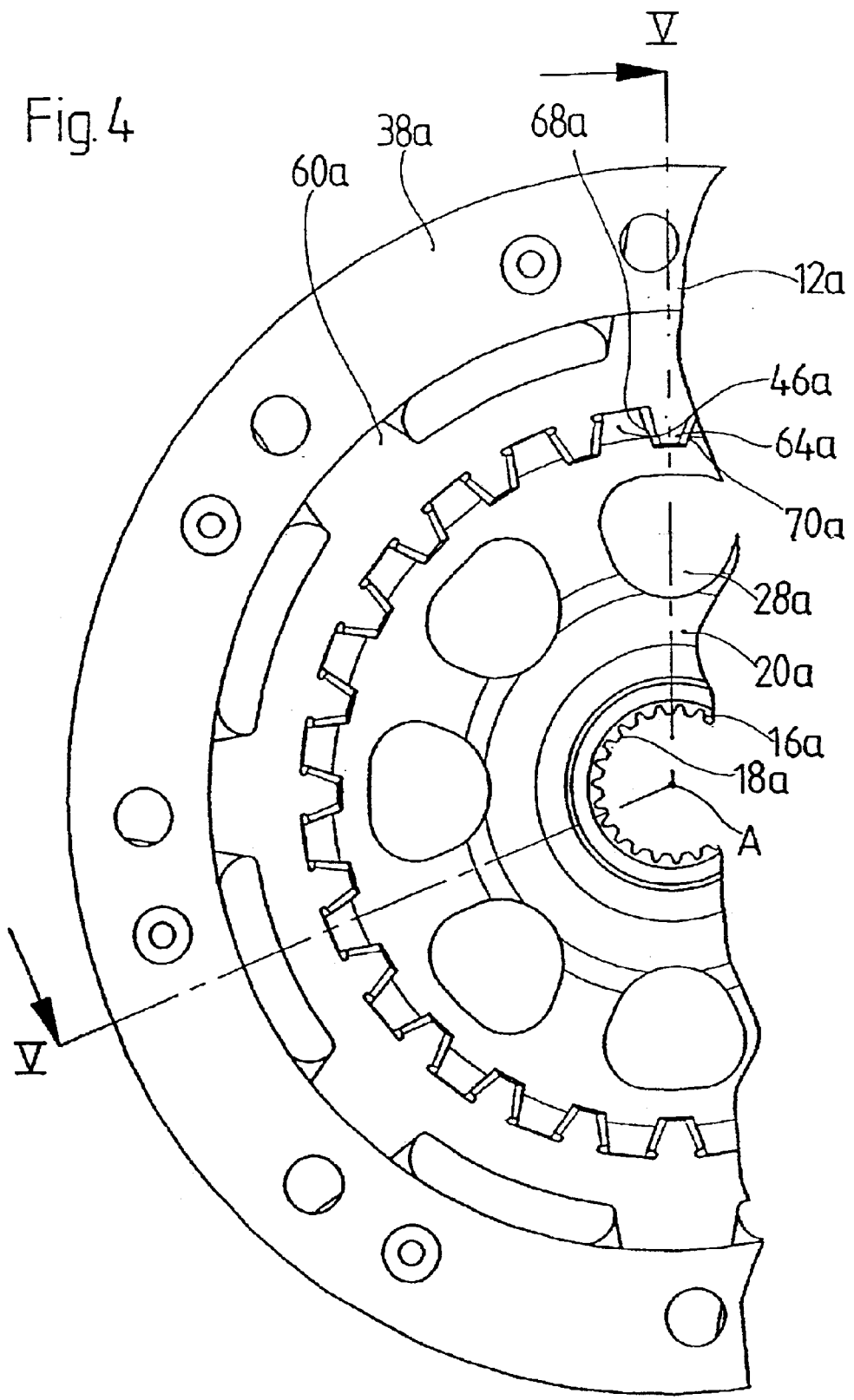
FIG. 4 is a partial axial view of another embodiment of the clutch disk arrangement according to the present invention.
Figure 5:
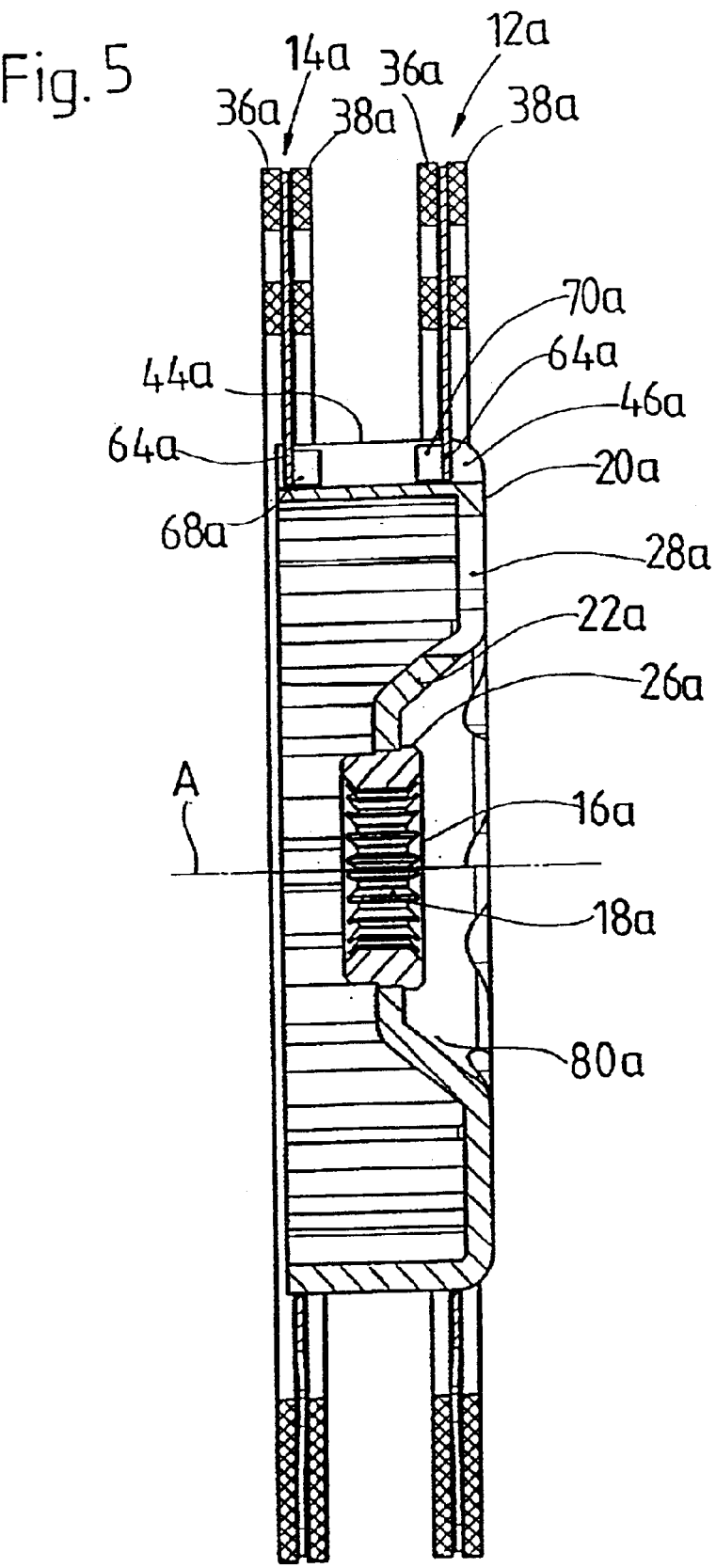
FIG. 5 is a longitudinal sectional view of the clutch disk arrangement shown in FIG. 4, along the line V—V in FIG. 4.
Figure 6:
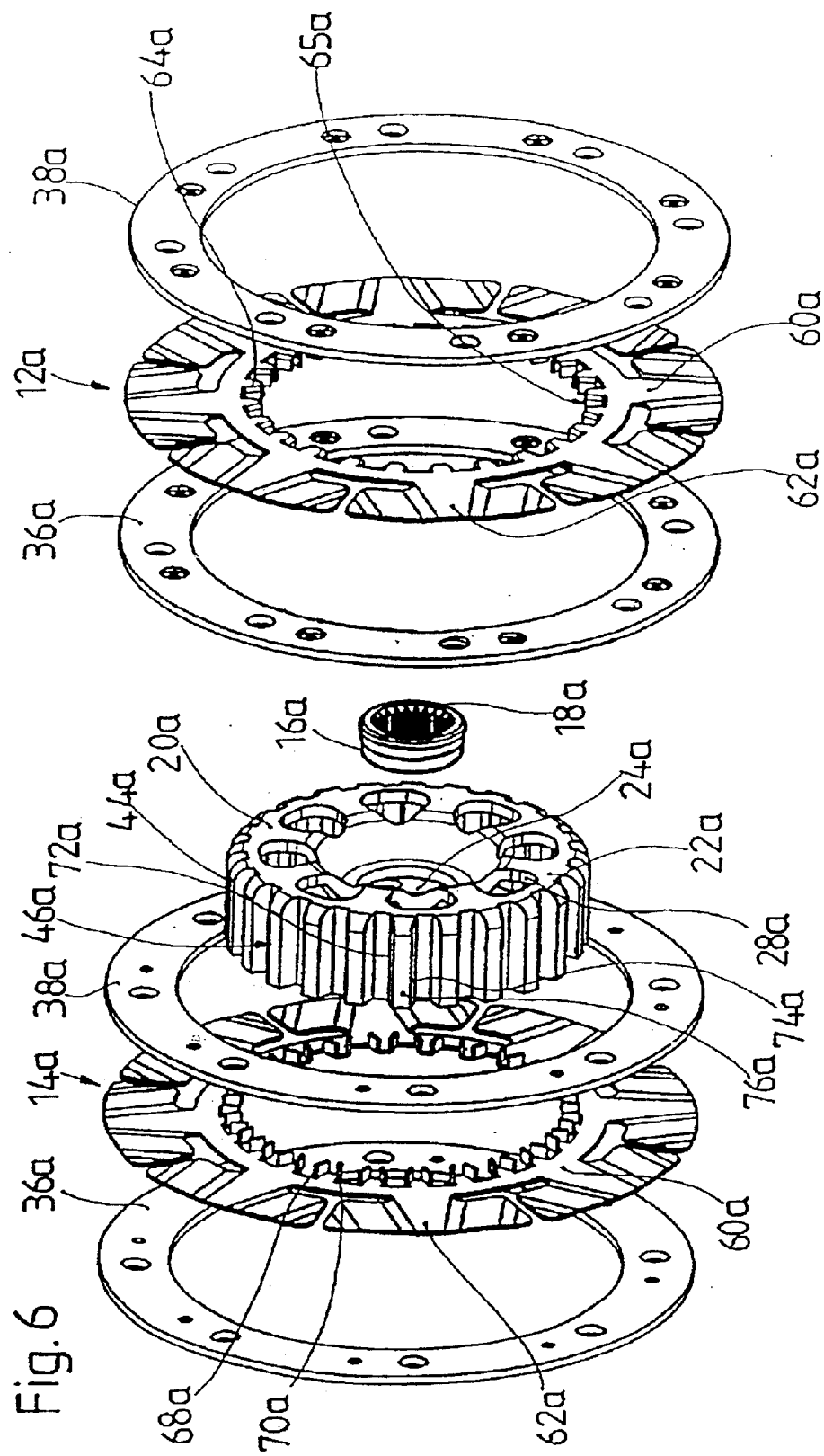
FIG. 6 is a perspective exploded view of the clutch disk arrangement illustrated in FIG. 4.

Referring now to FIGS. 4 to 6, another embodiment of a clutch disk arrangement according to the invention will be described. Components which correspond in terms of construction or function to components described above are denoted by the same reference numeral with the addition of suffix "a".

The embodiment of the clutch disk arrangement 10a of FIGS. 4–6 comprises a single carrier element 20a which is firmly connected to the hub element 16a. This carrier element 20a once again has an essentially cup-shaped configuration with an opening 24a for attachment to the hub element 16a formed in a cup base region 22a of the carrier element 20a. The circumferential wall region 44a of the cup-shaped carrier element 20a once again has a toothing configuration 46a provided therein during formation of the carrier element 20a. The axial extent of the toothing configuration 46a is greater than the axial extent of the toothing configurations 46, 55 of FIGS. 1–3. Each of the first and second friction lining units 12a, 14a comprises a lining carrier part 60a of annular design. Referring to FIG. 6, the radially outer region of the lining carrier part 60a comprises respective lining springs 62a to which the friction linings 36a, 38a are fixed by riveting or adhesive bonding. The radially inner region of the lining carrier element 60a has a plurality of projections 64a which follow one another in the circumferential direction and together form a toothing configuration 65a which is complementary to the toothing configuration 46a of the carrier element 20a. These two toothing configurations 46a, 66a may be brought into meshed engagement with one another by pushing one axially onto the other. Accordingly, the first and second friction lining units 12a, 14a are coupled to the carrier element 20a such that they are fixed with respect to rotation and axially movable relative to the carrier element 20a.

To reduce the surface pressure on the contact areas of first and second friction lining units 12a, 14a in the region of the projections 64a, tab-like extensions 68a, 70a are bent out of both circumferential ends of the projections 64a. These tab-like extensions 68a, 70a come to rest against the side faces 72a, 74a between each adjacent pair of the teeth 76a of the toothing configuration 46a.

The cup base region 22a of the carrier element 20a has a raised portion 80a in the radial inner area of the cup base region 22a. That is, the cup base region 22a is arched toward the open end of the space formed by the cup base region 22a and the circumferential wall area 44a of the carrier element 20a (see FIG. 5). Accordingly, the first and second friction lining units 12a, 14a may be positioned to assume an approximately symmetrical position relative to the hub element 16a in the direction of the axis of rotation A, thereby enabling very uniform power transmission to be achieved here. Furthermore, the hub element 16a may be formed with a shorter axial length than the hub element 16 of the embodiment in FIGS. 1 to 3. The shorter axial length of the hub 16a is allowed because, in the embodiment in accordance with FIGS. 1 to 3, the axial displaceability of the friction lining unit connected to the first carrier element which is fixed on the hub element is achieved by virtue of the fact that the hub element is axially displaceable on the shaft coupled to the latter in a manner which prevents relative rotation. However, in the embodiment in accordance with FIGS. 4 to 6, the axial displaceability of all friction lining units 12a, 14a is obtained solely by the projections 64a which engage in the toothing configuration 46a, whereas the hub element 16a does not have to be axially displaceable on the associated shaft and may, for example, be axially fixed thereon.

The embodiment in accordance with FIGS. 4 to 6 has reduced number of components. Furthermore, the carrier element 20a may be formed at extremely reasonable cost in a forming operation, e.g. a deepdrawing operation from a sheet-metal blank. Accordingly, the embodiment of FIGS. 4–6 is particularly simple to assemble and costs are minimized because the carrier element is simple to produce.

Figure 9:
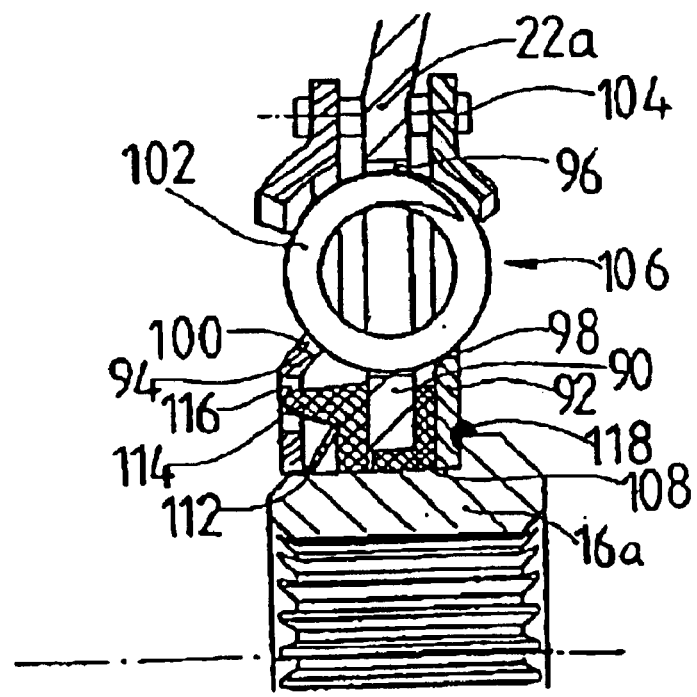
FIG. 9 is a partial sectional view of the clutch disk arrangement of FIGS. 4–6 with a torsional vibration damper.
Figure 10:
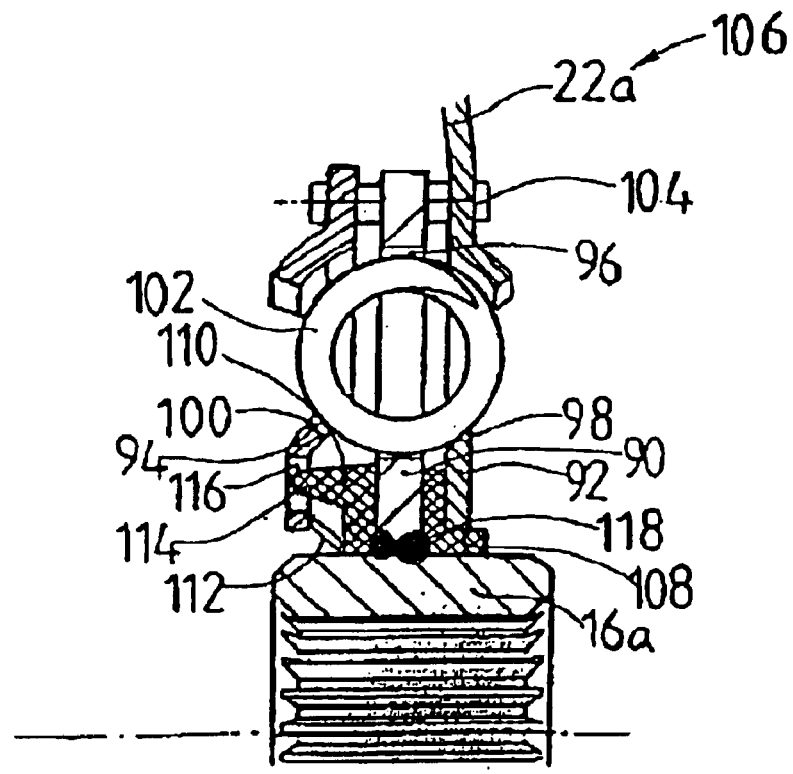
FIG. 10 is a partial sectional view of another embodiment of the clutch disk arrangement of FIGS. 4–6 with a torsional vibration damper.

It should be pointed out that the individual lining-spring elements illustrated in the embodiment in accordance with FIGS. 1 to 3 may be used in the embodiment according to FIGS. 4–6, in which case they should each bear at least one of the projections. Similarly, the use of an integrally formed lining carrier element such as that shown in FIGS. 4 to 6 may be used in the embodiment in FIGS. 1 to 3. In the embodiment in accordance with FIGS. 4 to 6, it is furthermore also possible for the carrier element 20a to be coupled to the hub element 16a with the interposition of a torsional vibration damping function, as has been described above by way of example. This means that the base region 22a can form a subregion, i.e., a central disk or cover disk, of a torsional vibration damper as shown in FIGS. 9 and 10, the torsional vibration damper 106 in FIGS. 9 and 10 being similar to the torsional vibration damper 106 discussed above with reference to FIGS. 7 and 8.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements which perform substantially the same function in substantially the same way to achieve the same results are within the scope of the invention. Moreover, it should be recognized that structures and/or elements shown and described in connection with any disclosed form or embodiment of the invention may be incorporated in any other disclosed or described or suggested form or embodiment as a general matter of design choice. It is the intention, therefore, to be limited only as indicated by the scope of the claims appended hereto.

I claim:

1. A clutch disk arrangement for a multi-disk clutch, comprising: a hub element fixedly connectable with respect to rotation about an axis of rotation to a shaft; a carrier arrangement comprising a carrier element fixedly connectable with respect to rotation relative to said hub and having a cup-shaped design having a cup base region and a circumferential wall area; at least two friction lining units connected to said carrier so that said at least two friction disks are fixed with respect to rotation relative and axially movable relative to said carrier element; and a torsional vibration damper operatively arranged between said carrier element and said hub element.

2. The clutch disk arrangement of claim 1, further comprising an engagement formation on said circumferential wall region of said carrier element and respective counterengagement formations arranged on each of said at least two friction lining units for engaging said engagement formation so that said at least two friction lining units are fixed with respect to rotation and axially movable relative to said carrier element.

3. The clutch disk arrangement of claim 2, wherein said engagement formation comprises an external toothing extending longitudinally along the direction of said axis of rotation.

4. The clutch disk arrangement of claim 2, wherein said carrier element comprises a sheet-metal blank formed via a press forming operation.

5. The clutch disk arrangement of claim 2, wherein each of said friction lining units comprises at least one lining carrier comprising one part of said counterengagement formation.

6. The clutch disk arrangement as claimed in claim 1, wherein said torsional vibration damper comprises central disk element formed by a base region of said carrier element, a cover disk element arranged on said hub element on each side of said central disk element, and at least one damping element operatively arranged between said central disk element and said cover disk elements.

7. A clutch disk arrangement for a multi-disk clutch, comprising: a hub element fixedly connectable with respect to rotation about an axis of rotation to a shaft; a carrier arrangement comprising a carrier element fixedly connectable with respect to rotation relative to said hub and having a cup-shaped design having a cup base region and a circumferential wall area; at least two friction lining units connected to said carrier so that said at least two friction disks are fixed with respect to rotation relative and axially movable relative to said carrier element; and an engagement formation on said circumferential wall region of said carrier element and respective counterengagement formations arranged on each of said at least two friction lining units for engaging said engagement formation so that said at least two friction lining units are fixed with respect to rotation and axially movable relative to said carrier element, wherein each of said friction lining units comprises at least one lining carrier comprising one part of said counterengagement formation, and said one part of said counterengagement formation comprises at least one engagement projection arranged on said at least one lining carrier.

8. The clutch disk arrangement of claim 7, further comprising a tab-like extension arranged on each of said at least one engagement projection, wherein at least one contact surface of said counterengagement formation is formed on said at least one engagement projection by bending said tab-like extension.

9. The clutch disk arrangement of claim 7, wherein said engagement formation comprises an external toothing extending longitudinally along the direction of said axis of rotation.

10. The clutch disk arrangement of claim 7, wherein said carrier element comprises a sheet-metal blank formed via a press forming operation.

11. The clutch disk arrangement of claim 7, wherein each of said friction lining units comprises at least one lining carrier comprising one part of said counterengagement formation.

* * * * *